H. SCHLESINGER.
COOKING UTENSIL.
APPLICATION FILED JULY 9, 1919.
1,326,214.
Patented Dec. 30, 1919.
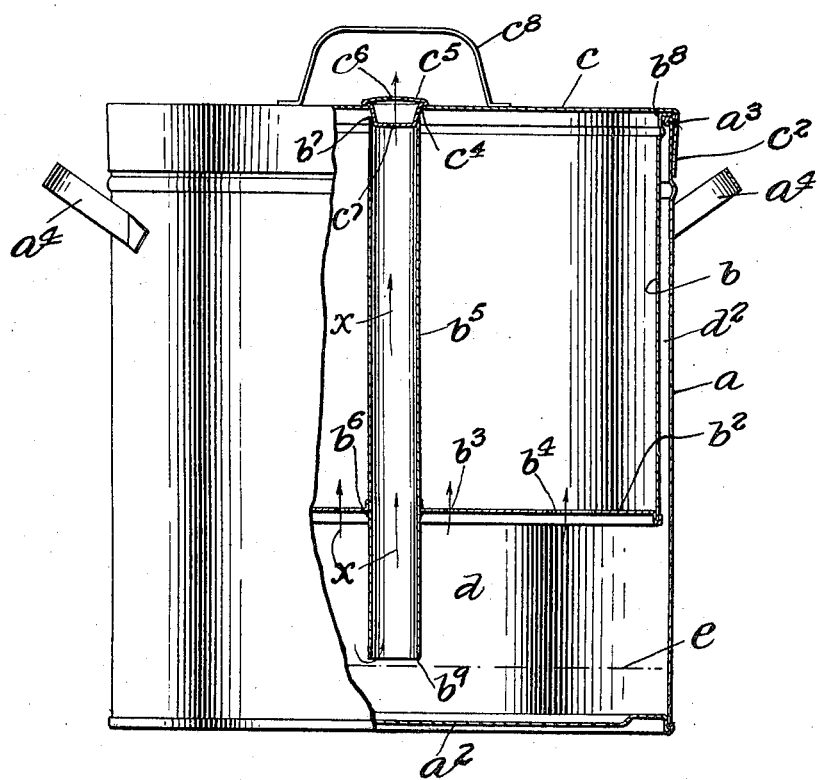
Inventor
Henry Schlesinger,
By his Attorneys

UNITED STATES PATENT OFFICE.

HENRY SCHLESINGER, OF NEW YORK, N. Y., ASSIGNOR OF THREE-FOURTHS TO WILLIAM J. JAEGER, OF NEW YORK, N. Y.

COOKING UTENSIL.

1,326,214.  Specification of Letters Patent.  Patented Dec. 30, 1919.

Application filed July 9, 1919. Serial No. 309,538.

*To all whom it may concern:*

Be it known that I, HENRY SCHLESINGER, a citizen of the United States, and residing at New York, in the county of New York and State of New York, have invented certain new and useful Improvements in Cooking Utensils, of which the following is a specification, such as will enable those skilled in the art to which it appertains to make and use the same.

This invention relates to cooking utensils and particularly to what are known as steam cookers, and the object thereof is to provide an improved device of this class designed particularly for use in cooking potatoes, vegetables and fruits, and which also may be used, if desired, for cooking meats; a further object being to provide a cooker of the class specified which is simple in construction and efficient in operation; and with these and other objects in view the invention consists in a cooking utensil of the class specified, constructed and operating as hereinafter described and claimed.

The invention is fully disclosed in the following specification, of which the accompanying drawing forms a part, said drawing being a sectional side view of my improved cooking utensil.

In the accompanying drawing the separate parts of my improvement are designated by suitable reference characters in each of the views and, in the practice of my invention, I provide a main can or receptacle $a$ which is open at the top and provided with a closed bottom $a^2$, and said main can or receptacle may be of any desired capacity or size and dimension.

The main can or receptacle is provided at the top thereof with an annular inwardly rolled bead $a^3$, and I also provide a supplemental can or receptacle $b$ which is of approximately the same form as the main can or receptacle, and which is of less dimensions both as to depth and transversely thereof. The supplemental can or receptacle $b$ is also open at the top and is provided with a bottom $b^2$ having perforations or apertures $b^3$ and $b^4$, the perforations or apertures $b^3$ being smaller than those shown at $b^4$, in the construction shown, and said supplemental can or receptacle is provided with a central tube $b^5$ which passes downwardly through the bottom thereof and is secured therein as shown at $b^6$, and the tube $b^5$ extends upwardly to a point $b^7$ near the top of said supplemental can or receptacle.

The main can or receptacle $a$ is provided, in the construction shown, with side handles $a^4$ and the supplemental can or receptacle $b$ is provided at the top thereof with an outwardly directed flange or rim $b^8$ which is adapted to rest on the annular bead $a^3$ at the top of the main can or receptacle.

I also provide a detachable cover $c$ for the supplemental can or receptacle, said cover being provided with a depending flange or rim $c^2$ which is adapted to inclose the top of the main can or receptacle, and said cover $c$ is provided centrally thereof with an aperture $c^4$ in which is secured a hollow thimble-shaped whistle device $c^5$, the top of which is provided with an aperture $c^6$ and the bottom with a corresponding aperture $c^7$, and the cover $c$ is also provided in the construction shown with a handle $c^8$.

In the use of this device the supplemental receptacle $b$ is inserted into the main receptacle as shown in the drawing and occupies about two-thirds of the space therein, and in the bottom of the main receptacle $a$ is a chamber $d$ and around the supplemental receptacle is an annular space $d^2$ which communicates with the chamber $d$, and the tube $b^5$ secured centrally in the supplemental receptacle extends downwardly into the chamber $d$ to a predetermined point as shown at $b^9$ when said supplemental receptacle is in position for use.

In the use of this device, when the parts are in the position shown in the drawing, water is poured into the supplemental receptacle and passes downwardly through the bottom thereof into the chamber $d$ until it rises to the bottom of the supplemental receptacle, after which the articles or materials to be cooked is placed in the supplemental receptacle, after which the cover $c$ is placed in position, and in this operation the bottom of the whistle device $c^5$, the walls of which are tapered as shown, enters the top of the tube $b^5$ and closes the same.

The cooking utensil is then placed on or over a suitable burner, or heater of any class, and as the water in the chamber $d$ is gradually heated the steam passes upwardly through the apertures $b^3$ and $b^4$ into the supplemental receptacle and the material therein is cooked by said steam, the water of condensation, if any, and the over-pressure of steam passing downwardly through the apertures $b^3$ and $b^4$ into the chamber $d$. When this process has continued for about thirty-five minutes or until the material in the supplemental receptacle is sufficiently cooked, the level of the water in the chamber $d$ will fall below the bottom of the tube $b^5$, or to the line $e$ in said chamber and the steam will pass up through the tube $b^5$ as indicated by the arrows $x$, and will operate the whistle device $c^5$ and this will notify the operator that the device is ready to be removed from the stove or other heater, after which the cover $c$ may be removed and the remainder of the steam in the supplemental receptacle, if any, will escape through the open top thereof and the cooked material may be removed from said supplemental receptacle as will be readily understood.

With my improved cooker, the material cooked may be left in the device for any desired length of time and may be maintained at the desired heat as long as necessary, simply by reducing the heat over which the utensil is placed, and by means of my improvement I provide a cooking utensil which is simple in construction, efficient in use and which is also comparatively inexpensive, and while I have shown and described a form of construction which I prefer to employ, my invention is not limited to the details thereof herein shown and described, and changes therein and modifications thereof may be made, within the scope of the appended claims, without departing from the spirit of my invention or sacrificing its advantages.

Having fully described my invention what I claim as new and desire to secure by Letters Patent, is:—

1. A steam cooking utensil comprising an outer receptacle having an open top, an inner perforated receptacle located in the outer receptacle and having an outwardly extending flange resting on the upper edge of the outer receptacle for supporting the former, the bottom of the inner receptacle being spaced away from the bottom of the outer receptacle to provide a chamber to be filled with water when the utensil is to be used, a single open ended steam tube secured centrally in the bottom of the inner receptacle and extending downwardly into said chamber and upwardly into close proximity to the upper ends of the receptacles, and a detachable imperforate cover for the receptacles carrying a whistle device which detachably engages the upper end of the tube and is operated by steam in the tube when the water in the chamber has fallen to a level below the lower end of the tube.

2. A receptacle of the kind defined in claim 1 in which the cover is provided with a downwardly extending skirt coöperating with the upper portion of one of said receptacles for sealing the open end of the same, and the whistle device is tapered toward its bottom to guide the same into the upper end of the tube.

In testimony that I claim the foregoing as my invention I have signed my name in presence of the subscribing witnesses this 8th day of July, 1919.

HENRY SCHLESINGER.

Witnesses:
C. E. MULREANY,
H. E. THOMPSON.